United States Patent [19]

Zagrodnik et al.

[11] Patent Number: 4,948,681
[45] Date of Patent: Aug. 14, 1990

[54] TERMINAL ELECTRODE

[75] Inventors: Jeffrey P. Zagrodnik, Hales Corners; Gerald K. Bowen, Cedarburg, both of Wis.

[73] Assignee: Globe-Union Inc., Milwaukee, Wis.

[21] Appl. No.: 376,218

[22] Filed: Jun. 30, 1989

Related U.S. Application Data

[63] Continuation of Ser. No. 189,363, May 2, 1988, abandoned.

[51] Int. Cl.⁵ .................... H01M 2/40; H01M 4/86
[52] U.S. Cl. .......................... 429/34; 429/70
[58] Field of Search .............. 429/33, 34, 35, 36, 429/37, 38, 39, 70, 152, 154, 178

[56] References Cited

U.S. PATENT DOCUMENTS

| | | | |
|---|---|---|---|
| 3,003,013 | 10/1961 | Duddy | 429/154 |
| 3,806,368 | 4/1974 | Maricle et al. | 136/ |
| 3,964,928 | 6/1976 | Britz et al. | 136/86 |
| 4,057,675 | 11/1977 | Halberstadt et al. | 429/39 |
| 4,164,068 | 8/1979 | Shropshire et al. | 29/623.1 |
| 4,175,165 | 11/1979 | Adlhart | 429/33 |
| 4,188,462 | 2/1980 | Klootwyk | 429/70 |
| 4,208,473 | 6/1980 | Bradley | 429/112 |
| 4,211,833 | 7/1980 | Einstein | 429/149 |
| 4,275,130 | 6/1981 | Rippel et al. | 429/144 |
| 4,286,027 | 8/1981 | Shropshire et al. | 429/18 |
| 4,401,714 | 8/1983 | Otto et al. | 429/221 |
| 4,482,614 | 11/1984 | Zito, Jr. | 429/70 |
| 4,502,929 | 3/1985 | Stewart et al. | 204/147 |
| 4,658,499 | 4/1987 | Rowlette | 29/623 |
| 4,677,041 | 6/1987 | Specht | 429/206 |
| 4,719,157 | 1/1988 | Tsutsumi et al. | 429/34 |
| 4,734,342 | 3/1988 | Seiger | 429/178 |

Primary Examiner—Donald L. Walton
Attorney, Agent, or Firm—Foley & Lardner

[57] ABSTRACT

The present invention facilitates electrical transmission from a flow battery to a load along a path of minimal electrical resistance. The terminal electrode comprises a metal screen encapsulated in plastic sheets, with a nonconductive plastic frame injection molded around the periphery thereof. One or more studs are soldered to the outward facing surface of the screen.

14 Claims, 4 Drawing Sheets

TERMINAL ELECTRODE

This is a continuation of application Ser. No. 189,363 filed May 2, 1988, abandoned.

TECHNICAL FIELD

This invention relates, generally, to a terminal electrode for collecting current at an end of a flow battery, and more particularly, to a terminal electrode having an internal screen with at least one load connecting stud attached thereto, such that current collected by the screen is transmitted to the load along a path of minimal electrical resistance.

BACKGROUND OF THE INVENTION

Electrochemical cells utilizing monopolar or bipolar cell designs having reactive electrodes are well known. Conventional flow batteries are typically comprised of a "stack" of cells, an electrolyte pump, an electrolyte reservoir, a cooling element, and external studs in electrical communication with the terminal electrodes. Each cell is comprised of an electrode upon which the anodic reaction takes place and an electrode upon which the cathodic reaction takes place In a monopolar battery, each electrode functions as a single pole, so that two separate electrodes (anode and cathode) are required to form an individual cell. The electrochemical potential between the anode and the cathode determines each cell voltage. An ion-permeable barrier, or separator, separates the anodic half cell from the cathodic half cell. The cells forming the stack are hydraulically isolated from each other and electrically connected in series by highly conductive straps which extend outside the battery body. A separate strap connects the anode of one cell to the cathode of an adjacent cell; there is no strap connecting an anode to the cathode of the same cell. The cells located at opposite ends of the stack each have an unconnected electrode, there being no adjacent cell. These unconnected electrodes function as the terminal anode and terminal cathode, respectively. Typically, a strap or stud connects each terminal electrode to a power supply (during charge) or to a load (during discharge).

Electron flow in a monopolar battery involves ionic and electrical transmission of electrons. Within each cell, electrons leave the cathode, travel ionically through the electrolyte and separator, and are deposited on the anode. The electrons then leave the body of the battery as they travel electronically through the strap to the cathode of the adjacent cell.

In a bipolar battery, on the other hand, each electrode comprises two "poles", such that the anodic reaction occurs on one side of the electrode and the cathodic reaction occurs on the opposite side of the same electrode. Thus, in contrast to a monopolar battery, which requires two separate electrodes per cell, a bipolar battery is comprised of bipolar electrodes upon which both the anodic and cathodic reactions occur. As with a monopolar battery, the cells in a bipolar battery are electronically connected in series. Unlike a monopolar battery, where the cells are hydraulically isolated, the cells of a bipolar battery are hydraulically connected in parallel.

Current flow in a bipolar battery also involves electrical and ionic transmission: (1) electrons travel ionically through the electrolyte and through the ionpermeable separator; and (2) electrons flow electrically between adjacent cells via a conductive substrate, i.e., the bipolar electrode, which is common to both the anodic and cathodic half cells.

Thus, whereas current typically "leaves" a monopolar battery as it travels through the straps, electron flow in a bipolar battery is entirely internal. As a result, bipolar batteries generally possess a higher current density than monopolar batteries because of decreased electrical resistance.

Zinc-bromine electrochemical systems have yielded varying degrees of success in bipolar flow battery applications. See Zito, U.S. Pat. No. 4,482,614, issued Nov. 13, 1984, the disclosure of which is hereby incorporated by reference. In a typical bipolar zinc-bromine battery, aqueous zinc bromide electrolyte is circulated throughout the various half cells. The zinc bromide solution contains a rich supply of positively charged zinc ions and negatively charged bromide ions. In addition, conductivity additives such as $KCl$ and $NH_4Cl$ are added to the solution to reduce ionic resistance and facilitate passage of the ions through the separators.

The battery stack is comprised of alternating electrodes and separators such that an anode half cell is disposed on one side of each electrode and a cathode half cell is disposed on the opposite side of each electrode. For each cell, one half cell contains the anolyte and the other half cell contains the catholyte. An anolyte pump urges the anolyte through a common anolyte manifold to each anodic half cell and a catholyte pump supplies the catholyte to each cathodic half cell through a parallel common catholyte manifold. The alternating separators and electrodes are sealed together in a manner which prevents communication between the anolyte and catholyte hydraulic systems.

In the discharged state, the electrolyte solution in the anode system is chemically identical to the electrolyte solution in the cathode system. During charging, the following reactions take place:

$$Zn^{++} + 2e^- \rightarrow Zn^\circ$$

$$2Br^- \rightarrow Br_2 + 2e^-$$

reactions proceed primarily to the right, with zinc plating at the anodic surface of each electrode in the stack. At the same time, molecular bromine is formed at the cathodic surface of each electrode. Upon being formed, the molecular bromine combines with a complexing agent to form a quaternary ammonium complex phase, or "second phase". The second phase is pumped through the system and stored in the catholyte reservoir. When the battery is fully charged, a supply of plated zinc is stored on one side of each electrode and a supply of complex bromine is stored in the catholyte reservoir.

Upon discharge, the following reactions occur:

$$Br_2 + 2e^- \rightarrow 2Br^-$$

$$Zn^\circ \rightarrow Zn^{++} + 2e^-$$

The discharge reactions proceed primarily to the right until all the plated zinc is removed from the electrode surfaces. During the discharge phase, the plated zinc is oxidized and the freed electrons pass through the electrode where they join with molecular bromine to form bromide ions. The positively charged zinc ions travel through the separator and remain in solution. At the same time, the bromide ions pass through the separator in the opposite direction and remain in solution. As the discharge reactions occur on opposite sides of each electrode, (1) complex bromine is reduced and (2) plated zinc is oxidized, resulting in a supply of electrons traveling ionically through the separators and electrolyte, and electrically through the electrodes.

At the end battery, the electrons contact the terminal , where the current is collected and transmitted to a load. The electrical and mechanical with which these electrons are transferred to the in large measure determines the practical utility of the battery. Thus, terminal electrode configurations are of considerable commercial importance.

Regardless of the particular configuration of the terminal electrode, some means must be provided whereby the load may physically attach to the battery. See, for example, Britz et al., U.S. Pat. No. 3,964,928, June 22, 1976 (Col. 5, lines 39–49). It is generally known to use a screen, mesh or honeycomb material as an electrode and to physically attach the current collector to the screen. See Otto, et al., U.S. Pat. No. 4,401,714, Aug. 30, 1983 (Col. 3, lines 40–48). A perforated plate having conductive metal elements disposed therein may be used as a current collector. See Rowlette, U.S. Pat. No. 4,658,499, Apr. 21, 1987 (Col. 4, lines 13–20). It is also generally known to place the terminal in electrical contact with the current collector. See FIGS. 1 and 2, and Column 3, lines 25–33 of Specht, U.S. Pat. No. 4,677,041, June 30, 1987.

Others have attempted to gather current from a terminal electrode and conduct it to the battery terminal by employing metal plates in surface to surface contact with the terminal electrode. See, for example, Bradley, U.S. Pat. No. 4,208,473, June 17, 1980 (Col. 6, lines 31–34; FIG. 5).

Presently known terminal electrode configurations, however, are unsatisfactory in several regards. For example, screens and other thin current collecting materials typically extend beyond the periphery of the electrode in the region where the terminal is attached to the collector. Repeated attachment of the load to the terminal tends to flex the thin collector material so that, over time, the material becomes weak or forms cracks, thus reducing the number of current paths and increasing electrical resistance. This is an especially persistent problem when screen is employed as the collector material, as screens are typically on the order of 0.003 inches thick.

In addition, in electrode configurations in which the current collector or any metallic portion of the terminal electrode is disposed external to the battery, corrosion problems arise.

SUMMARY OF THE INVENTION

The present invention facilitates electrical transmission from a flow battery to a load along a path of minimal electrical resistance. The terminal electrode comprises a metal screen encapsulated in plastic sheets, with a non-conductive plastic frame injection molded around the periphery thereof. One or more studs are soldered to the outward facing surface of the screen.

BRIEF DESCRIPTION OF THE DRAWING

A preferred exemplary embodiment of a terminal electrode in accordance with the present invention will hereinafter be described in conjunction with the appended drawing, wherein like designations denote like elements, and.

DETAILED DESCRIPTION OF EXEMPLARY EMBODIMENTS

Figure 1:
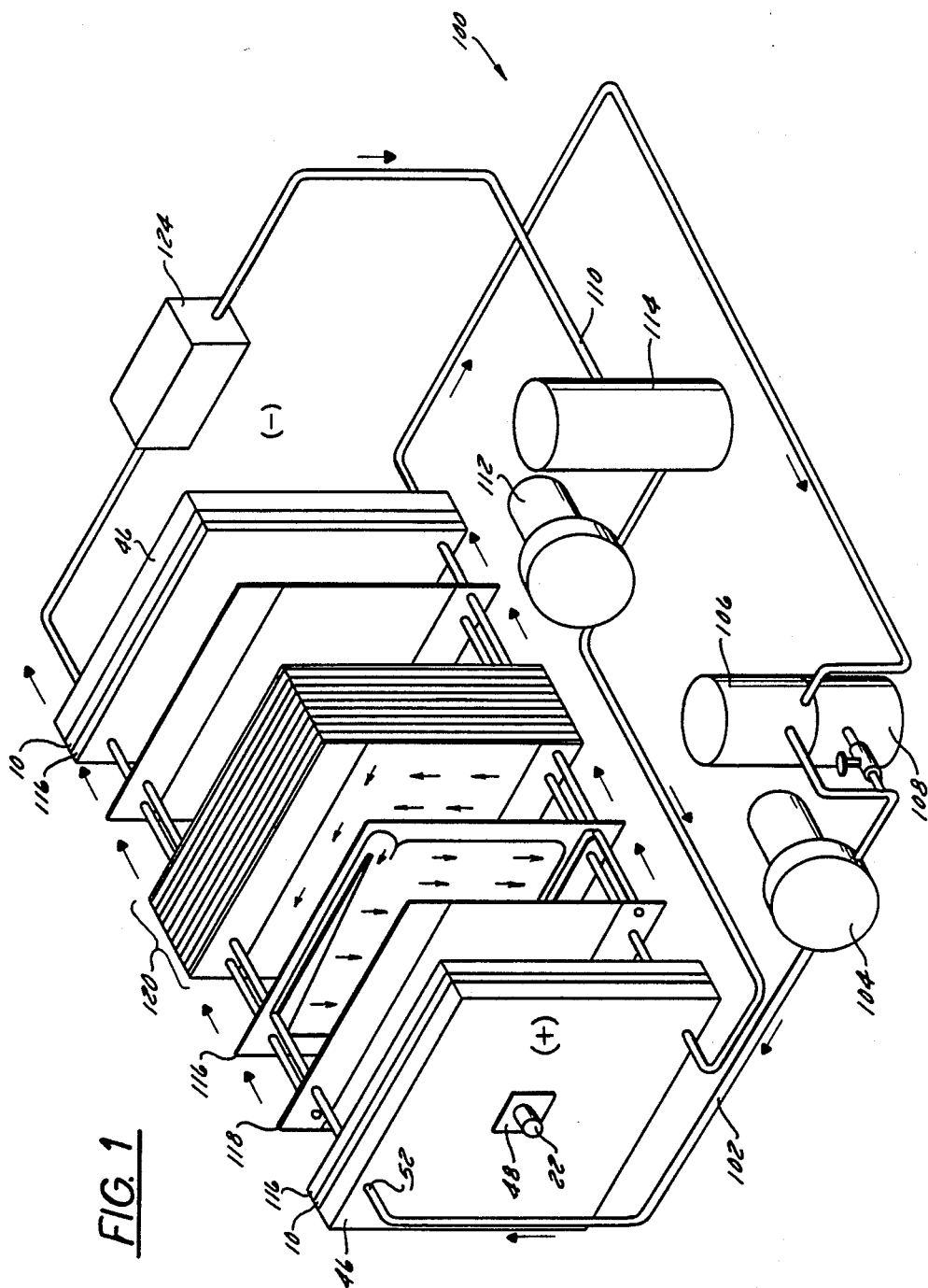
FIG. 1 is a schematic diagram of an exemplary embodiment of a terminal electrode constructed in accordance with the present invention, shown sandwiched between an endblock and a separator, in operative cooperation with a typical bipolar flow battery.
Figure 2:
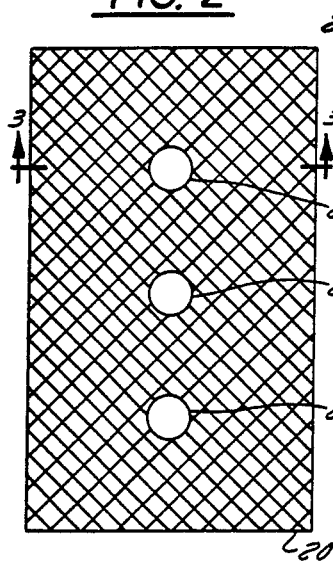
FIG. 2 is a top view of a metal screen having a plurality of load connecting studs soldered thereto.
Figure 4A:
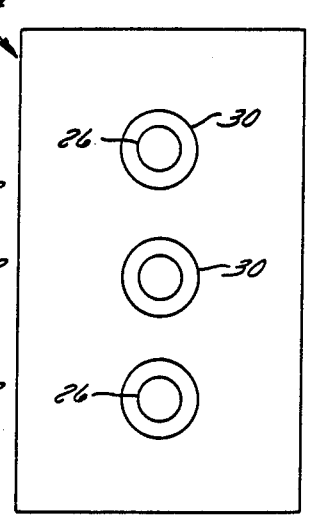
FIG. 4A is a top view of an external plastic sheet.
Figure 4B:
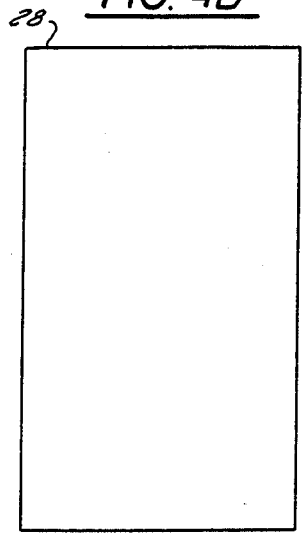
FIG. 4B is a top view of an internal conductive plastic sheet.
Figure 3:
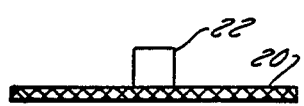
FIG. 3 is a section view of the screen assembly of FIG. 2.

Referring to FIG. 1, a terminal electrode 10 in accordance with the present invention is shown disposed between an endblock 46 and a separator 116 at each end of a typical bipolar flow battery 100. Flow battery 100 comprises a series of alternating separators 116 and electrodes 118, sealed together to form a "stack" 120 of electrochemical cells. Respective endblocks 46, disposed at each end of battery 100, are attached to terminal electrodes 10 by conventional sealing methods, including friction welding. Endblock 46 has an opening 48 for receiving stud 22 of terminal electrode 10.

Aqueous anolyte is stored in an anolyte reservoir 114 and pumped through a common anolyte manifold 110 by an anolyte pump 112. Anolyte is thus supplied to each anodic half cell of battery 100. Similarly, aqueous catholyte, stored in a catholyte reservoir 106, is pumped through a common catholyte manifold 102 by a catholyte pump 104. In addition, a complex catholyte reservoir 108 is disposed in fluidic communication with catholyte reservoir 106 for storing the complex phase, discussed below.

On some larger flow batteries, wherein significant quantities of heat may be internally generated, a cooling element 124 may be provided.

Figure 8:
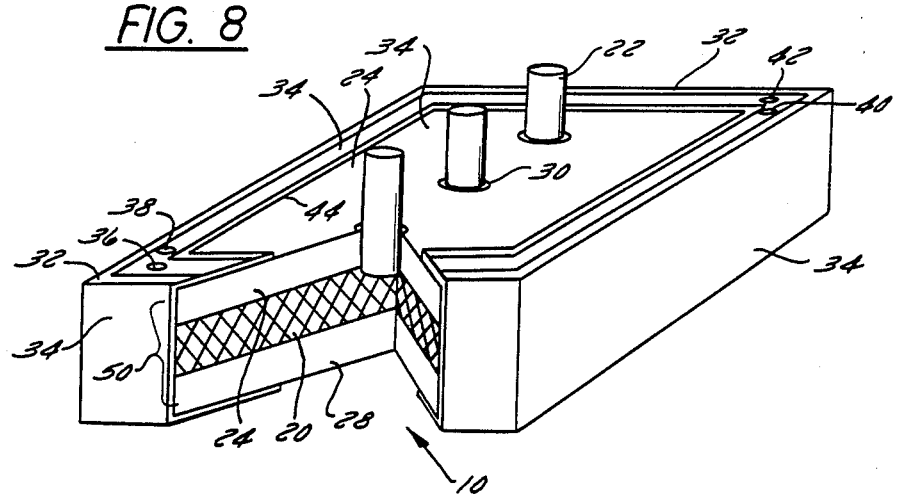
FIG. 8 is a perspective view of the assembly shown in FIG. 7, with the thickness dimension exaggerated to illustrate the relative positions of the various layers.

Referring now to FIG. 8, terminal electrode 10 suitably comprises an internal screen 20 sandwiched between an outward facing conductive or nonconductive plastic sheet 24 and an inward facing conductive plastic sheet 28. Plastic sheets 24 and 28 should be bromine resistant and may be made from polyethylene, polypropylene, or various copolymers thereof. In addition, carbon black may be incorporated into plastic sheet 28 to provide electrical conductivity. Screen 20 functions as a current collector, and may be made from Ag, Cu, Pb, Zr, Ti, Ta, or Nb alloys. Alternatively, the current collector may be in the form of a thin metal sheet, which may be perforated. One or more studs 22 are soldered, welded, or brazed to screen 20 to provide a path of minimum electrical resistance from the current collecting screen 20 to the external load attached to studs 22. Stud 22, sometimes referred to as a bus bar, can be made from any metal, although copper rod stock is preferred. Stud 22 may have a cross-section which is circular, square, or any configuration which facilitates attachment to a load. The stud may be threaded internally or externally, or knurled to further facilitate attachment to a load.

Figure 6:
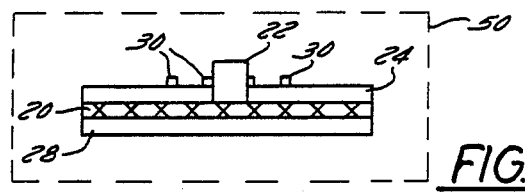
FIG. 6 is a section view of the compression molded assembly of FIG. 5.

Referring now to FIGS. 2-5, current collector screen 20 is shown soldered to one or more studs 22. External sheet 24 is placed on the stud side, or outward facing side, of screen 20, and internal sheet 28 is placed on the opposite side, or inward facing side of screen 20. External sheet 24, internal sheet 28, and screen 20 are compression molded together to form a compression molded assembly 50, as seen in FIG. 6. Weld ribs 30, disposed on the outward facing surface of external sheet 24, may circumscribe studs 22. Weld ribs 30 may be square, circular, or any shape which facilitates effective sealing of the stud region of assembly 50 to endblock 46, as described below.

Figure 5:
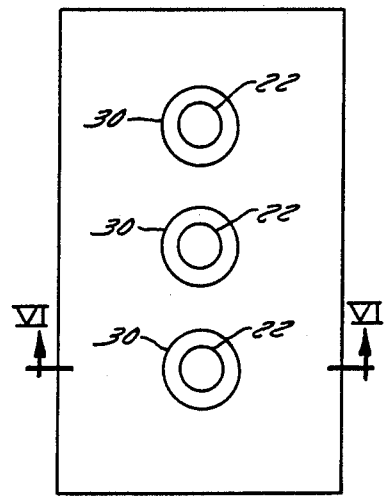
FIG. 5 is a top view of the external plastic sheet of FIG. 4A, shown compression molded to the screen assembly of FIGS. 2 and 3.
Figure 7:
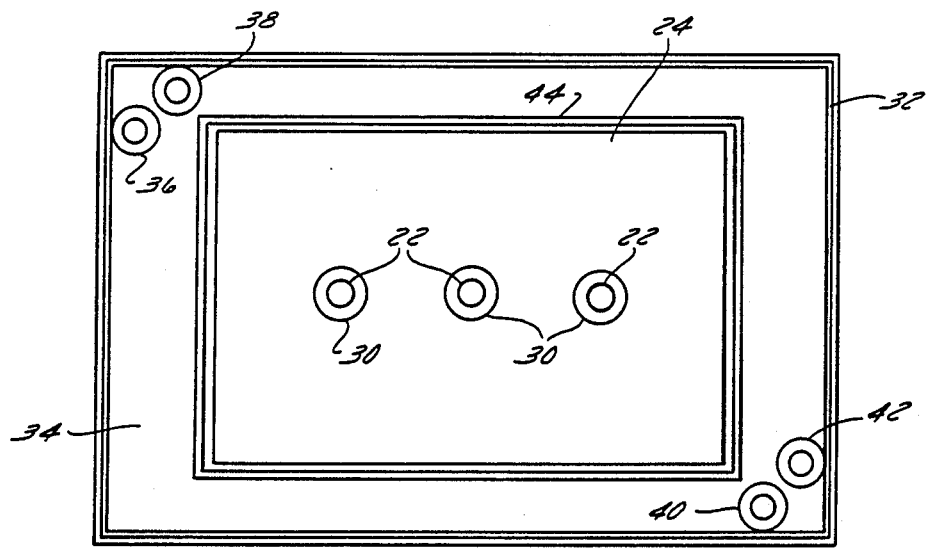
FIG. 7 is a top view of the compression molded assemblies of FIGS. 5 and 6, shown with a nonconductive plastic frame injection molded around the periphery thereof.

Referring now to FIGS. 1, and 7-9, compression molded assembly 50 of FIGS. 5 and 6 is shown with the non-conductive plastic frame 34 injection molded around the periphery. Frame 34 is similar in shape and size to the other electrode and separator frames contained in the battery stack. The peripheral weld ribs 32 and interstitial weld ribs 44 are designed to facilitate a friction-welded engagement with end block 46. Furthermore, an anolyte inlet duct 36, an anolyte discharge duct 42, and respective catholyte discharge and inlet ducts 38 and 40 are provided to facilitate passage of aqueous anolyte and catholyte through their respective common manifolds (see FIG. 1). Similarly, weld ribs 30 facilitate the forming of a friction-welded seal about studs 22 between terminal electrode 10 and endblock 46. Frame 34 can be made from polyethylene, polypropylene, various copolymers thereof, PVC, CPVC, or Ionomer.

Frame 34 is injection molded around and thus sealed to assembly 50 in a manner which yields a region of overlap between the periphery of assembly 50 and the inside edges of frame 34 in a common plane. This ensures that screen 20 is completely encapsulated in a plastic envelope in the event a portion of it extends beyond the edges of sheet 24 or 28. Alternatively, the frame 34 and terminal electrode assembly 50 can be fabricated simultaneously by compression molding.

Figure 9B:
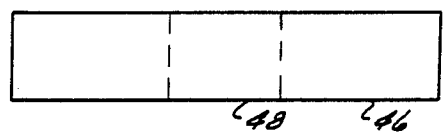
FIG. 9B is an end view of the endblock of FIG. 9A.
Figure 9A:
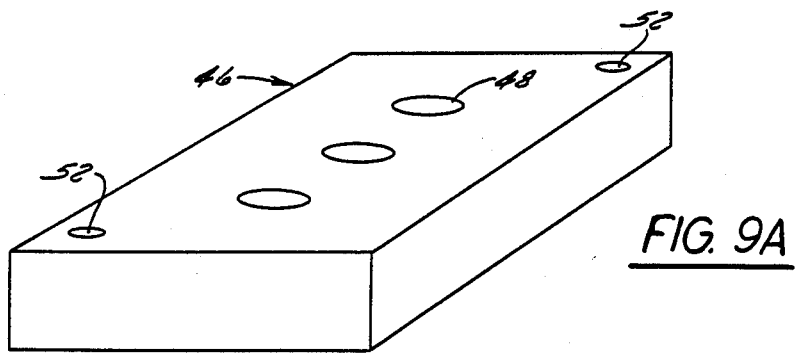
FIG. 9A is a perspective view of an endblock.

Referring to FIGS. 1, 8, and 9, terminal electrode 10 is attached to endblock 46, preferably by friction welding. Endblock 46 may be made from polyethylene, polypropylene, various copolymers thereof, PVC, CPVC or Ionomer. Weld beads, or ribs, are provided on the surface of terminal electrode 10, whereas the mating surface of endblock 46 is preferably planar. Electrolyte inlet/discharge openings 52 communicate with anolyte and catholyte inlet ports 36 and 40 at one end of battery 100 and anolyte and catholyte discharge ports 38 and 42 at the opposite end. During the friction welding (or vibration welding) process, stud weld ribs 30, interstitial weld ribs 44, and peripheral weld ribs 32 fuse with the surface of endblock 46 to form a leak proof seal.

An important feature of the present invention is the position of the stud relative to the screen. To minimize total internal electrical resistance, and hence maximize current density, the total distance traveled by the electrons from the current collector (screen) to the stud should be minimized. When a single stud is used, as shown in FIG. 1, the stud should be placed in the center of the terminal electrode so that the average total distance traveled by all electrons impinging on the screen is minimized. When more than one stud is used, as shown in FIGS. 2-7, they should be symmetrically placed, to the extent mechanical considerations allow, so that the total distance traveled by all electrons is minimized.

Another important advantage of the present invention is the disposition of the current collecting screen. As shown in FIG. 6, screen 20 is encapsulated between sheets 24 and 28 during the compression molding process. The result is that no portion of screen 20 is exposed to the environment, which eliminates undesirable arcing and corrosion problems.

Another important advantage of the present invention is that the injection molded plastic frame can be readily redesigned to accommodate changes in battery design. Moreover, the technique used in construction of the subject terminal electrode, namely, soldering the studs directly to the screen and encapsulating the screen in a compression molded conductive plastic assembly, can be readily applied to a wide variety of electrode and battery configurations.

It will be understood that, while various stud configurations are shown in the drawing, for example a single stud or a plurality of studs, they are not shown in a limiting sense, and may comprise any number of studs in a variety of configurations. Further, the above description is of preferred exemplary embodiments of the present invention, and the invention is not limited to the specific forms shown. These and other modifications may be made in the design and arrangement of the elements within the scope of the invention, as expressed in the appended claims.

What is claimed:

1. A bipolar flow battery, comprising:
   a series of half cells in electrical communication with one another, said cells being defined by a plurality of partitions comprising alternating electrodes and separators, each partition being secured to each adjacent partition about a common perimeter therewith, said series of half cells having a terminal electrode at an end thereof;
   an endblock, disposed at an end of said series of half cells, said endblock being secured to said terminal electrode;
   an electrolyte manifold in hydraulic communication with said half cells; and
   an electrolyte pump for urging electrolyte through said manifold and into said half cells;
   said terminal electrode comprising:
      a substantially flat metal screen having an electrically conductive stud attached to the external surface thereof, wherein said screen, including the region in which said stud is attached thereto, is encapsulated within a plastic envelope such that said screen is isolated from said electrolyte; and
      a nonconductive plastic frame disposed about the perimeter of said plastic envelope such that the perimeter of said screen is disposed within the perimeter of said frame.

2. The bipolar flow battery of claim 1, wherein said plastic envelope is made from a material selected from the group consisting of polyethylene, polypropylene, and copolymers thereof.

3. The bipolar flow battery of claim 1, wherein at least a portion of said plastic envelope is electrically conductive.

4. The bipolar flow battery of claim 3, wherein said plastic envelope is electrically conductive.

5. The bipolar flow battery of claim 1, wherein said nonconductive plastic frame comprises a pattern of weld ribs substantially conforming to the perimeter of said stud to facilitate friction welded attachment of said plastic envelope to said end block.

6. The bipolar flow battery of claim 5, wherein said weld rib pattern further comprises weld ribs substantially conforming to the perimeter of said frame to facilitate friction welded attachment of said end block to said frame.

7. The bipolar flow battery of claim 1, wherein said stud is soldered to said screen.

8. The bipolar flow battery of claim 1, wherein said plastic envelope further comprises carbon black incorporated thereinto.

9. The bipolar flow battery of claim 1, wherein said screen is selected from the group consisting of alloys of Ag, Cu, Pb, Zr, Ti, Ta and Nb.

10. The bipolar flow battery of claim 1, wherein said stud is substantially cylindrical.

11. The bipolar flow battery of claim 1, further comprising a plurality of conductive studs attached to the external surface of said screen.

12. A composite terminal electrode comprising:
a thin, flat, current collector having first and second opposing surfaces;
a first electrically conductive plastic sheet, having finely divided electrically conductive particles dispersed therethrough, overlying said first surface of said current collector;
a substantially cylindrical electrically conductive stud integral with and extending from said first surface of said current collector and said first sheet;
a second electrically conductive plastic sheet, having finely divided electrically conductive particles dispersed therethrough, overlying said second surface of said current collector; and
a thin, flat nonconductive plastic frame disposed about the perimeter of said current collector and said first and said second sheets such that said current collector is encapsulated within said sheets and said frame, said frame including an anolyte and a catholyte flow passage extending therethrough transverse to a plane substantially defined by said composite terminal electrode.

13. The terminal electrode of claim 12, further comprising:
a first weld rib pattern formed on the external surface of said first sheet, said first pattern substantially conforming to and circumscribing the perimeter of said studs;

a second weld rib pattern formed about the perimeter of said frame to facilitate friction welded attachment to an adjacent frame.

14. A bipolar flow battery, comprising:
a plurality of planar partitions defining a series of half cells therebetween;
an anolyte reservoir;
an anolyte manifold communicating with said anolyte reservoir;
an anolyte pump, cooperating with said anolyte reservoir, disposed to urge acqueous anolyte from said anolyte reservoir, through said anolyte manifold, and back into said anolyte reservoir;
a catholyte reservoir;
a catholyte manifold communicating with said catholyte reservoir;
a catholyte pump, cooperating with said catholyte reservoir, disposed to urge acqueous catholyte from said catholyte reservoir through said catholyte manifold, and back into said catholyte reservoir;
a plurality of nonconductive plastic frames circumscribed about the perimeter of each of said partitions, respectively, each of said frames including:
a first weld rib pattern formed proximate the outer perimeter of said frame;
an anolyte and a catholyte flow passage configured for coaxial alignment with corresponding passages disposed on adjacent of said frames to form a portion of said anolyte and catholyte manifolds, respectively; and
channel means, communicating with said anolyte flow passage, for directing anolyte across the surface of one of said partitions;
a composite terminal electrode comprising:
a metallic screen;
an electrically conductive stud extending from an outward surface of said screen and forming a mechanical and electrical junction therewith;
an electrically conductive plastic envelope disposed about said screen, said screen and said junction being encapsulated within said envelope such that said screen is hydraulically isolated from said anolyte and said catholyte;
a nonconductive plastic terminal frame disposed about the perimeter of said composite terminal electrode, said terminal frame having a second weld rib pattern disposed about the perimeter of an outward surface thereof, said outward surface corresponding to said outward surface of said screen;
said composite terminal electrode being secured to an end of said plurality of planar partitions in the vicinity of one of said first weld rib patterns; and
an endblock, having an opening through which said stud extends, said endblock being secured to said terminal frame in the vicinity of said second weld rib pattern.

* * * * *